United States Patent [19]

Klein

[11] Patent Number: 4,627,863
[45] Date of Patent: Dec. 9, 1986

[54] FILTER FOR AIR HANDLING EQUIPMENT
[76] Inventor: Max Klein, P.O. Box 3, Dalton, N.J. 01226
[21] Appl. No.: 761,018
[22] Filed: Jul. 31, 1985
[51] Int. Cl.$^4$ ............................................ B01D 46/18
[52] U.S. Cl. ........................................ 55/354; 55/528; 242/55.2; 242/68.4
[58] Field of Search .................. 55/354, 492, 528; 98/115.2; 242/55.2, 68.4, 129.51

[56] References Cited
U.S. PATENT DOCUMENTS

| 1,277,553 | 9/1918 | Crandall | 242/129.51 |
|---|---|---|---|
| 2,722,993 | 11/1955 | Gerber et al. | 55/354 |
| 2,875,680 | 3/1959 | Forshee | 55/354 X |
| 3,013,630 | 12/1961 | Palmore | 55/354 |
| 3,216,183 | 11/1965 | Larsson | 55/478 |
| 3,350,854 | 11/1967 | Revell | 55/354 |
| 3,552,099 | 1/1971 | Floyd | 55/354 |
| 3,616,620 | 11/1971 | Neumann | 55/354 |
| 3,647,158 | 3/1972 | Feder | 242/55.2 |
| 3,710,588 | 1/1973 | Martinez | 62/317 |
| 4,174,205 | 11/1979 | Koushiafes | 55/354 |
| 4,239,516 | 12/1980 | Klein | 55/389 |
| 4,293,378 | 10/1981 | Klein | 162/145 |
| 4,372,500 | 2/1983 | Saraisky | 242/55 |

Primary Examiner—Harold Joyce
Attorney, Agent, or Firm—Dann, Dorfman, Herrell & Skillman

[57] ABSTRACT

A filter apparatus for air handling systems in which the air inlet grille of the system is provided with an additional filtration medium which extends across the full flow passage area of the grille. In the preferred form of the invention, the filter medium is in the form of a flexible sheet material wrapped on a hollow core shell which is housed in a storage enclosure along side the grille. The sheet filter medium is drawn out from the storage chamber through a discharge slot across the full length of the grille, and suitable guide means is provided to assure proper positioning of the filter medium to cover the entire flow passage area of the grille. The mounting of the roll in the storage chamber is such as to provide a frictional engagement which permits the roll to rotate to pay off the filter medium, but with sufficient friction to avoid overrunning. The filter medium is preferably one of those disclosed in U.S. Pat. Nos. 4,239,516 and 4,239,278.

15 Claims, 4 Drawing Figures

U.S. Patent   Dec. 9, 1986   4,627,863
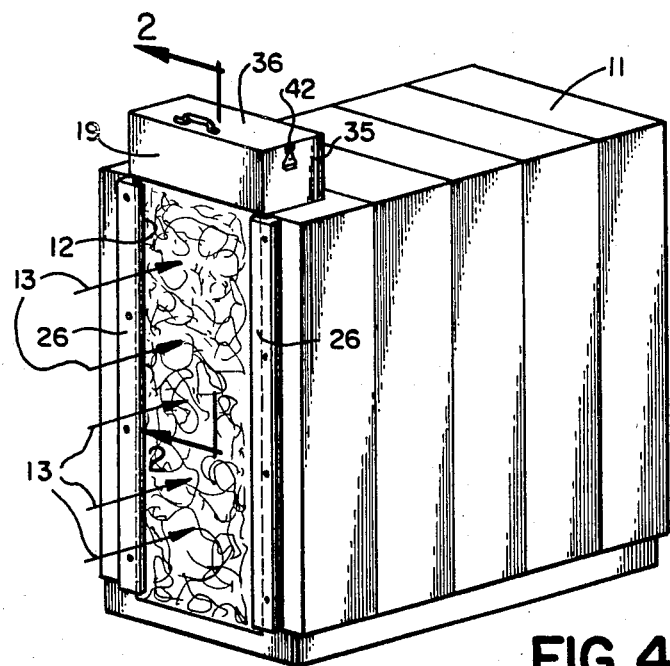
FIG. 1
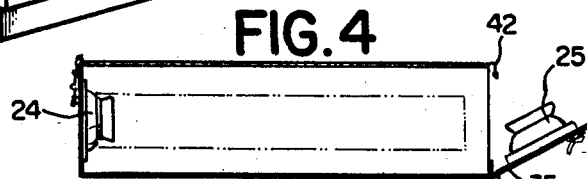
FIG. 4
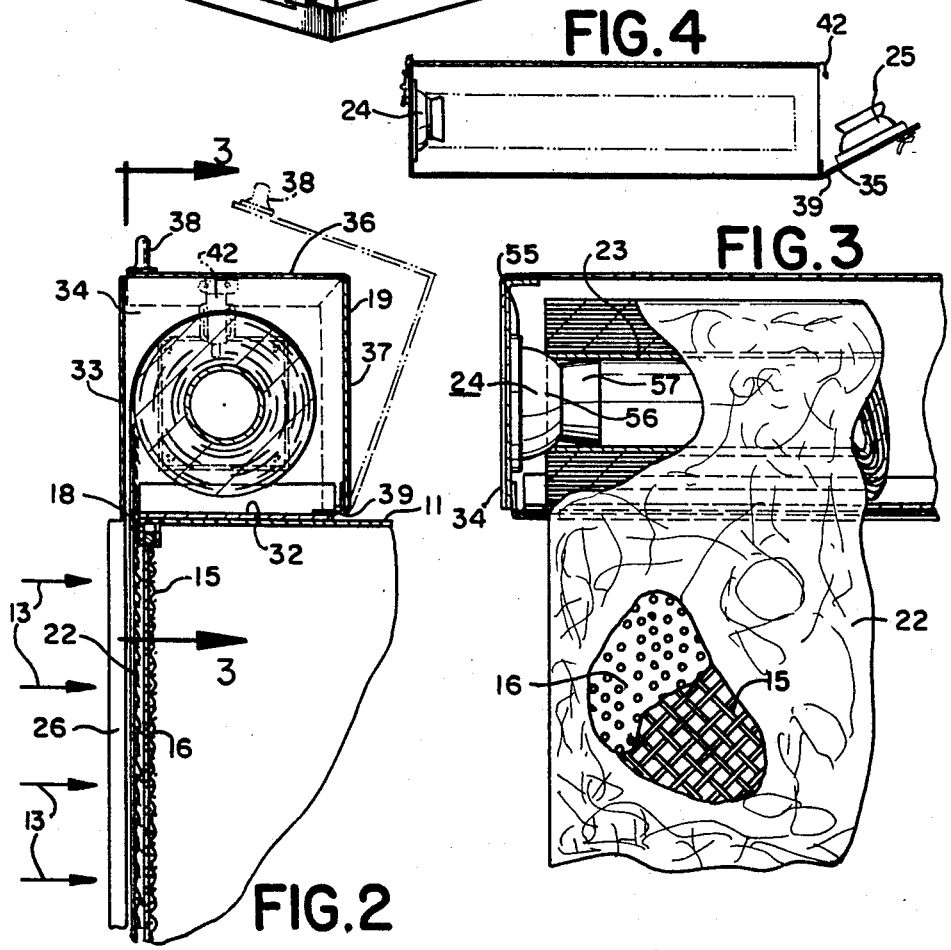
FIG. 2
FIG. 3

FILTER FOR AIR HANDLING EQUIPMENT

FIELD OF THE INVENTION

The present invention relates to a filter for air handling equipment and is particularly directed to a filter apparatus which is adapted to use a filter medium in sheet form which is supplied in rolls and in a form which may be discarded after it has been used.

BACKGROUND OF THE INVENTION

In factory installations where there is a large volume of air flow, for example in ventilating systems for plants, drying rooms, motor housings and the like, the air supply is normally taken from within the factory or else through special fresh-air inlet ducts. In ventilating systems where the air is conditioned, the conditioning apparatus is effective to remove the dust and other foreign particles which are taken in with the fresh air from the factory or outside. However, where the ventilating air is not conditioned, there is frequently no attempt to filter the air. In motor housings, the presence of foreign particles in the air stream may lead to premature failure of the motors or may cause arcing or other dangerous conditions within the housing. Normally the inlet to the housing is provided with a grille which prevents trash or other large debris from entering the system, but such grilles do not prevent entry of dust or small particles. It has been the practice where dust presents a problem to simply use fiberglass furnace replaceable frame filters in the air inlet in order to remove the particulate matter which would otherwise enter the housing through the inlet.

Although the cost of fiberglass filters is minimal, in heavily dust-laden atmospheres, the filters tend to become clogged with dust particles, particularly where a humidity factor causes agglomeration of the dust particles in the filter medium. As a result there must be frequent servicing of the filters, normally entailing a brief shutdown of the equipment while the individual filters are removed and replaced with fresh filters. Because of the nuisance involved in exchanging filters, the task is often delayed or deferred to a point where the effectiveness of the filter is completely dissipated by reason of its being clogged with particles. If the deferment of servicing the filters is excessive, the motors or other equipment which is being ventilated by the air flow may be subject to premature failure.

SUMMARY OF THE PRESENT INVENTION

With the foregoing in mind, the present invention provides a simple and effective means for improving the efficiency of the filtration in air handling equipment.

More specifically the present invention provides a filter apparatus which employs a filter medium which may be of higher efficiency than the filter media used in prior arrangements, and yet which is of increased efficiency with respect to maintenance so that the overall economy of the system is improved over the prior art systems.

Specifically the present invention provided means wherein a continuous web of filter material in roll form is used to provide the filtration. The filter material is fed out across the air passageway to perform the filtration function and is mounted so that replacement of the filter medium is effected by simply withdrawing a fresh length of filter material across the air passage and then simply separating the spent filter material from the fresh filter material and discarding it after it is displaced relative to the air passage.

The mounting for the roll of filter material is simplified by having a pair of stub shafts engaging in the opposite hollow ends of the core of the roll material in such a fashion that the roll of material is able to rotate, but there is sufficient friction to avoid overrunning.

BRIEF DESCRIPTION OF THE DRAWINGS

FIG. 1 is a perspective view of the inlet end of a motor housing embodying filter apparatus according to the present invention;

FIG. 2 is a fragmentary sectional view taken on the line 2—2 of FIG. 1;

FIG. 3 is a sectional view taken on the line 3—3 of FIG. 2 with portions broken away to more clearly illustrate the structure of the apparatus; and FIG. 4 is a fragmentary end elevation at reduced scale of the filter apparatus shown in FIG. 1.

DESCRIPTION OF A PREFERRED EMBODIMENT OF THE INVENTION

With reference to the drawings, FIG. 1 illustrates the inlet of a housing 11 having a flow passage 12 at one end through which air may be introduced into the housing as indicated by the arrows 13. As shown in FIG. 2, the inlet passage 12 has a grille 15 removably mounted in the passage, in the present instance a wire frame work. In accordance with the invention, at the top of the housing 11 above the flow passage 12 is a horizontal structure 18 on which a storage chamber 19 is mounted so that it overhangs the structure 18 as shown in FIG. 2. The storage chamber 19 encloses the filter medium used in the present invention.

As shown in FIGS. 2 and 3, the filter medium is in continuous web form as shown at 22 in FIG. 3 and is wound up in roll form on a hollow core 23, in the present instance a cardboard shell which is hollow throughout to provide hollow end portions at the opposite ends. The cardboard of the tube 23 is sufficiently resilient to allow it to be compressed when stub shafts 24 and 25 are forceably engaged in the ends. The web material 22 is paid out from the cardboard core 23 and is fed through a discharge slot 25 in the bottom of the chamber 19 where it overhangs beyond the structural member 18. The web material then passes in front of the structural member 18 so as to overlie the wire grid 15 and cover the opening 12. As shown in FIG. 1, the wire grid 15 serves as a guide to direct the web material across the full length of the opening from top to bottom. As shown, the side edges of the opening 12 are provided with flanges 26 extending the full length of the opening on either side thereof. The flanges 26 project outwardly from the grid 15 and have a toe portion extending over the grid 15 so as to entrap the web material against the surface of the grid and limit outward displacement of the web material. The outwardly projecting parts of the flanges 26 provide lateral guidance to the web as it travels along the grid 15 so as to assure proper positioning of the web so it covers the entire flow passage 12. The spacing of the toe portions of the flanges 26 outwardly from the grid is sufficiently greater than the thickness of the web 22 so that the web is free to slide downwardly across the surface of the grid 15 without being pinched by the flanges 12.

In the event the wire grid 15 may tend to tear or damage the filter web 22, a perforated metal separator 16 may be mounted intermediate the grid 15 and the web 22. The perforated metal plate has sufficient flow passage openings therethrough to afford ample passage of air through the flow passage 12 and may be spot welded, or otherwise fastened to the wire grid 15 which is positioned in the opening. In such case, the perforated metal serves as a guiding surface to facilitate the slidable displacement of the filter web 22 across the face flow passage 12.

The storage chamber 19 is designed to house the roll of filter medium 22 and support it for unrolling displacement, as described above. To this end, the chamber 19 is formed in three pieces. The first piece includes a bottom wall 32, a front wall 33 and a first end wall 34. The walls 32, 33 and 34 are interconnected in a right trihedral angle to form one half of a tubular housing having a square cross section. The discharge slot 25 is positioned adjacent the juncture of the bottom wall 32 with the front wall 33. The second piece of the chamber 19 is formed by an opposite end wall 35 which mounts the stub shaft 25, and the third piece comprises the top wall 36 and the rear wall 37 which meet each other at right angles and form the other half of the tubular housing. The rear wall 37 is hinged to the bottom wall 32 at the edge remote from the slot 25 so that the third piece of the housing may pivot rearwardly as shown in broken lines in FIG. 2. A handle is provided at 38 to facilitate the manipulation of the walls 36 and 37 on their hinge 39. The end wall 35 is pivoted to the bottom wall 32 by a hinge 42 so that the wall 35 may swing outwardly as shown in FIG. 4. By pivoting the walls 36 and 37 backwardly and the wall 35 outwardly, the chamber 19 is fully opened for removal of the spent core 23 and reception of the core 23 of a fresh roll of filter medium. When the fresh roll is inserted, left hand end is inserted over the stub shaft 24 on the upstanding end wall 24 and then the right end wall 35 is swung upwardly on the hinge 42 to engage the shaft 25 in the opposite end of the core 23. The rear and top walls 37 and 36 are then swung into place and the chamber may then be latched into closed position by a latch mechanism 42 which interconnects the end wall 35 with the top wall 36 as shown in FIG. 1.

To provide the mounting of the roll for rotation with sufficient frictional engagement to retard overfeeding, the stub shafts 24 and 25 are generally bell-shaped in cross section preferably being formed of a substantially rigid plastic material which cooperates with the compressible nature of the cardboard core to provide freedom for rotation upon withdrawal of the filter web through the discharge opening. The bell-shaped outline of the shaft 24 is clearly shown in FIG. 3 wherein the shaft 24 has a flat base 55 engaging flush against the end wall 34 and secured thereto by suitable fasteners. A generally spherical zone-like segment 56 projects with its axis at right angles from the plate 55 to provide a generally tapered support for engagement within the end of the core 23. Beyond the spherical segment 56 an outwardly flared extension 57 is provided to facilitate engagement of the core 23 upon the stub shaft 24. The shaft 25 is similarly formed. The particular configurations of the shafts 24 and 25 cooperate with the structural characteristics of the core 23 to permit rotation of the core when the filter web is drawn down through the discharge opening 25, but there is sufficient frictional drag in order to retard overrunning when the withdrawal of the web material is arrested. When a core material different from cardboard is used for the roll of filter medium, the surface characteristic of the stub shafts 24 and 25 is modified to provide the desired cooperative relationship and frictional drag between the core and the stub shafts.

Thus the present invention provides a filter apparatus which is highly effective in operation and use and yet which is economical to install and maintain. The structure of the apparatus is extremely simple and may be readily manufactured at low cost. The storage chamber may be manufactured with an inside dimension sufficient to accommodate a wide variety of rolls of filter media and any variations between the different rolls may be accommodated by mounting different stub shafts within the chamber.

The present invention provides apparatus which may use any filter medium wound on rolls. However, the filter web 22 is preferably a paper-like non-woven web of the type disclosed in the Klein U.S. Pat. Nos. 4,239,516 and 4,293,378 and the entire disclosures of these patents are hereby incorporated into the present application by reference. It is sufficient to state that the filter medium comprises a loose web of glass fibers intermixed with micro-bits of an expanded thermoplastic styrene-polymer or expanded thermoplastic lower polyolefin or flexible foam polyurethane and suitable organic bonding agent. The filter may contain other additives or other consituents which function as molecular sieve particles or gas-absorption mechanisms for pollutants. The filter medium may be fabricated in various ways to provide the porosity and the filtration characteristics which are desired for a particular end use. For example, a filter medium made in paper-making apparatus in accordance with Example 1 of the aforesaid Klein U.S. Pat. No. 4,239,516, comprising polystyrene micro-bits, glass fibers and polyvinyl alcohol, has a porosity value of 602.8 liters per minute per square decimeter of surface at a pressure differential of 2.54 cm. of water (gauge). Another suitable filter medium is the mat described in Example 2 of Klein U.S. Pat. No. 4,293,378 which is also made using paper-making apparatus. The mat comprises glass fibers, the aforesaid polymer micro-bits, and an intimate blend or cobeat of polymer micro-bits, cellulose fibers and polyester fibers, together with polyvinyl alcohol as a binding agent and melamine-formaldehyde as a wet-stength enhancing agent. The porosity of the finished mat is generally from about 300 to about 1500 liters per minute per square decimater at a pressure differential of 2.54 cm. of water (gauge). The filter medium possesses excellent wet strength, which is on the order of 2 kg./cm.

Still another suitable filter medium is a non-woven material comprising cellulose and rayon fibers held together by a suitable organic binder and having activated carbon particles dispersed throughout for improved adsorption capacity. This medium is also conveniently prepared using standard paper-making apparatus and may, if desired, contain polyester fibers and the aforesaid micro-bits, the latter serving, inter alia, to prevent dusting of the carbon particles from the mat. Such a medium is commercially available from Crane & Co., Inc., Dalton, Mass. A mat of this type having porosity from about 150 to about 450 liters per minute per square decimeter at a pressure differential of 2.54 cm. of water (gauge) is very effective in filtering smoke-laden gases or vapors.

While a particular embodiment of the present invention has been herein illustrated and described it is not intended to limit the invention to such disclosures but changes and modifications may be made therein and thereto within the scope of the following claims.

I claim:

1. For an air-handling housing having a vertically-oriented elongated air flow passage and a support structure in vertical registry with said passage, filter apparatus adapted to use a filter medium in continuous web form wound in a roll on a selected cylindrical core, said core comprising a hollow shell of resilient material having hollow ends, said apparatus comprising a storage chamber mounted on said support structure, a discharge slot in said chamber adjacent one end of said passage and at least coextensive in width with said passage, and means in said chamber adapted to mount said roll of filter medium in a position to afford dispensing of said filter medium web through said discharge slot, and guide means below said discharge slot to slidably receive said filter medium web, said guide means extending from said slot across the entire length of said flow passage to slidably position said web in covering relationship thereto, said mounting means in said chamber comprising a pair of axially aligned stub shafts fixedly mounted when in operating position against rotation and axial displacement in said chamber and spaced apart a given distance less than the length of the said selected core, and adapted to telescopically engage in the hollow ends of said core, the material of said core and said shafts providing confronting friction surfaces, said stub shafts being of rigid material and having expanding bell-shaped outlines for insertion into the hollow ends of the shell to frictionally engage said expanding outlines with the free ends of the shell, the shape and axial spacing of said shafts in said operating position being selected relative to the shape and axial spacing of said hollow ends of the core so as to produce a frictional drag affording controlled rotation of said roll as said web is dispensed through said slot by manual withdrawal.

2. Apparatus according to claim 1 wherein said chamber comprises a tubular enclosure formed by side wall means adapted to surround said roll and opposite end walls, each end wall mounting one of said stub shafts, one of said end walls fixedly mounted in vertical position adjacent one end of the discharge slot and the opposite wall being mounted for movement to and from an operating position parallel to said one wall adjacent the other end of the discharge slot to afford removal and replacement of filter medium rolls from and on said stub shafts.

3. Apparatus according to claim 2 wherein said side wall means has four side walls in hollow square configuration, and said end walls are square to mate with said side walls, said opposite end wall being hinged to one of said four side walls for pivotal movement to and from said operating position.

4. Apparatus according to claim 3 wherein said side walls are formed in adjoining pairs, one of said pairs being pivoted to the other of said pairs along one corner of said hollow square configuration, and releasable latch means to lock said pairs in a position where said pairs meet together at the diagonally opposite corner of said configuration, whereby said enclosure may be opened by releasing said latch means and pivoting said pairs apart.

5. Apparatus according to claim 4 wherein said latch means connects said opposite end wall to the side wall which is opposite to the one side wall to which the end wall is hinged, so that a single latch is effective both to lock said enclosure in its closed position and to lock said opposite end wall in its operating position.

6. Apparatus according to claim 4 wherein said discharge slot extends along a corner of said enclosure between the aforesaid diagonally opposite corners.

7. Apparatus according to claim 1 wherein said guide means comprises a smooth support with a foraminous area covering said passage and lateral guides along said support adapted to engage the side edges of said filter medium web and maintain said web in a preselected path covering the foraminous area of said support.

8. Apparatus according to claim 7 wherein said lateral guides comprise flange elements projecting outwardly from said support and terminating in toe portions overlying said preselected path.

9. Apparatus according to claim 8 wherein said support comprises a flat sheet of perforated material disposed vertically across flow passage.

10. Apparatus according to claim 8 wherein said support comprises a grille across said passage having a wire grid coplanar with said air flow passage.

11. In combination with apparatus according to claim 1, a roll of filter medium in flexible web form wrapped on a hollow shell core mounted for rotation on said stub shafts in said storage chamber and extending from said core, through said discharge slot and along said guide means across the full length of said flow passage.

12. A combination according to claim 11 wherein said filter medium comprises a web of glass fibers with microbits of a synthetic polymer material combined with said fibers together with a binding agent to produce a web which is permeable to gaseous flow.

13. Apparatus according to claim 12 wherein said filter medium includes an intimate blend or cobeat of cellulose fibers and said microbits and a wet-strength enhancing agent.

14. Apparatus according to claim 11 wherein said filter medium comprises a web of cellulose and rayon fibes having activated carbon particles dispersed therein together with a binding agent to produce a mat which is permeable to gaseous flow, said mat having porosity from about 150 to about 450 liters per minute per square decimeter at a pressure differential of 2.54 cm. of water (gauge).

15. Apparatus according to claim 14 wherein said filter mat includes polyester fibers and microbits of a synthetic polymer material.

* * * * *